Sept. 2, 1952  P. J. SCHWARTZ  2,608,786
FISHHOOK CONSTRUCTION WITH PULL ACTUATED RELEASE MEANS
Filed Aug. 27, 1951

Paul J. Schwartz
INVENTOR.

BY *Clarence A. O'Brien*
*and Harvey B. Jackson*
Attorneys

Patented Sept. 2, 1952

2,608,786

UNITED STATES PATENT OFFICE 2,608,786

FISHHOOK CONSTRUCTION WITH PULL ACTUATED RELEASE MEANS

Paul J. Schwartz, Kingfisher, Okla.

Application August 27, 1951, Serial No. 243,853

3 Claims. (Cl. 43—36)

The present invention relates to certain new and useful improvements in fish hook constructions and has more particular reference to a construction which is characterized by a pair of fish hooks which are normally closed when baited and are mechanically sprung apart to open positions when the bait is taken.

Fish hooks of the nature above described, are, of course, old and well known. It follows that the present invention therefore has to do with structural refinements and improvements which combine to provide a construction which, it is believed, is more efficient and aptly suited to better attain the best possible over-all results desired.

Briefly summarized, the preferred embodiment of the invention comprises a holder and carrier for a pair of complemental fish hooks, said carrier being in the form of a V-shaped spring having expansible and contractable converging limbs joined at corresponding ends through the medium of a coil spring. A relatively movable pull actuated trigger is slidably mounted in the coil spring, has a line eye at the leading end and means at the trailing end for effectively setting and releasing the fish hooks.

An obvious object of the invention is to structurally, functionally and otherwise improve upon similarly constructed prior art pull actuated fish hooks.

Another object of the invention is to slidably link the trailing end of the stated trigger to one of the springable limbs through the medium of a ring, said ring constituting a keeper and being releasably engageable with a keeper hook carried by the other springable limb.

A further object of the invention is to provide the intermediate portion of the pull actuated trigger with a crook or bend which latter is associable with the spring coil and functions as a stop shoulder which engages the spring coil when the V-shaped holder is tripped and released to make the catch.

Other objects and advantages will become more readily apparent from the following description and the accompanying sheet of illustrative drawings.

In the accompanying sheet of drawings wherein like numerals are employed to designate like parts throughout the views.

Figure 1:
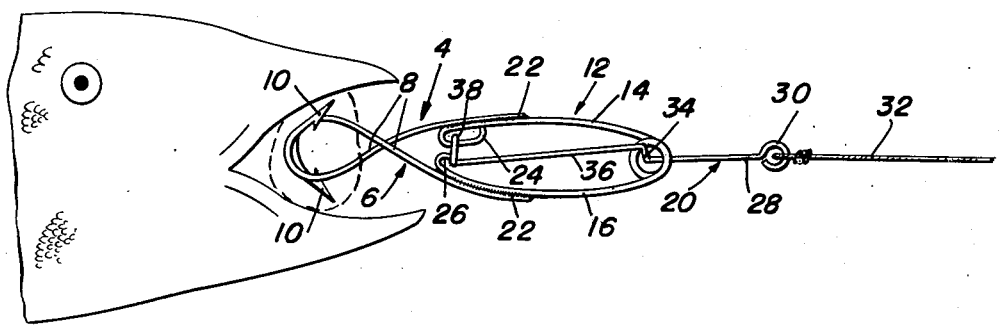
Figure 1 is a side elevational view of a fish hook construction having the stated improvements incorporated therein and showing the fish hook baited and closed.

In the drawings the fish hooks are duplicates of one another and denoted by the numerals 4 and 6 respectively. Each fish hook embodies a common shank portion 8 and a conventional barbed hook portion 10.

The holder and actuator means for the hooks 4 and 6 takes the form of a substantially V-shaped spring which is denoted, as a unit, by the numeral 12. The stated holder is formed from a single length of wire bent between its ends to define a pair of substantially duplicate and opposed resilient limbs 14 and 16. At corresponding ends the limbs are joined together by a coil spring 18 which has the additional function of a guide for the relatively reciprocable trigger 20. The opposite trailing ends of the limbs are free and are spreadable and the adjacent ends of the shanks 8—8 are welded or otherwise secured thereto as at 22—22. The limb 14 terminates in an elongate loop 24 which may be conveniently described as a link. The corresponding free end of the limb 16 terminates in an inturned bend constituting a keeper hook 26.

The trigger at its intermediate portion is slidably mounted in the guide coil. One end portion 28 terminates in an eye 30 which provides for attachment thereto of the fishing line 32. The intermediate portion is laterally bent to provide a crook 34 which axially offsets the end portion 28 in respect to the trailing end portion 36. This bend or crook is cooperable with the eye and constitutes a stop shoulder. The trailing end of the offset portion 36 is provided with a right angularly bent ring 38. This is slidably linked to the loop 24 and is releasably engageable with the keeper hook 26 and may therefore be described as a keeper ring.

With the arrangement shown the ring 38 is slidably anchored on and linked to the link 14 and provides a satisfactory association between the ring 38 and the hook 26 when the limbs 14 and 16 are swung together and set, as shown in Figure 1.

Figure 2:
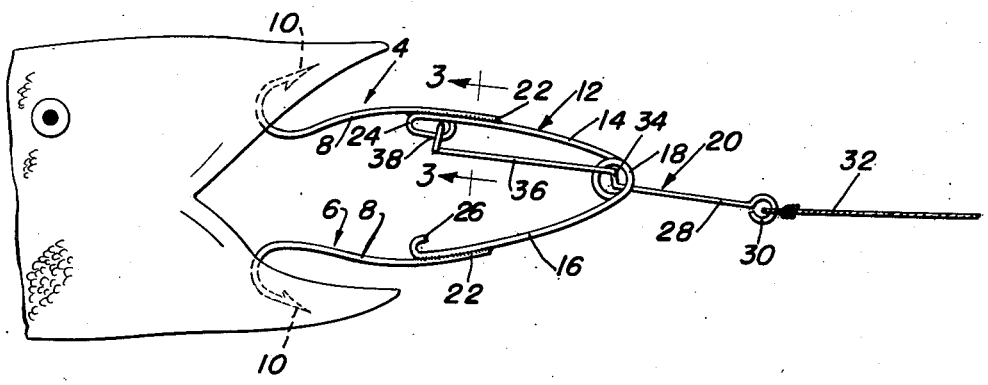
Figure 2 is a side elevation of the same with the fish hooks sprung to open position and embedded in the jaws of the fish.
Figure 3:
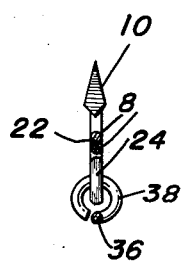
Figure 3 is an enlarged section on the plane of the line 3—3 of Figure 2, looking in the direction of the arrows.

With reference to Figure 1 the ring 38 is engaged with the keeper hook and simultaneously, of course with the link 24. At this time the shank portions of the respective fish hooks 4 and 6 are in crossed relationship and are in readiness to be sprung apart. With the device thus set and baited when the bait is taken by the fish it is obvious that the pull on the line 32 relative to the parts 4, 6 and 12 serves to trip the trigger. The resiliency of the coil spring 18 and the inherent resiliency of the limbs 14 and 16 causes the limbs to spring promptly apart and to drive the fish hooks into the jaws of the fish, as shown in dotted lines in Figure 2.

As before stated the improvements have to do with the permanent sliding linking connection between the ring 38 and loop 24, the relatively offset portions 28 and 36 of the trigger and the intermediate crook which coacts with the guide coil 18 and provides a check shoulder, in an obvious manner.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A pull actuated spring loaded fish hook construction comprising an expansible and contractible substantially V-shaped member embodying converging flexibly resilient limbs joined at corresponding ends through the medium of a coil spring, companion fish hooks carried by the opposite corresponding ends, the latter ends being spreadable and one of the latter ends having an inturned keeper hook, the remaining latter end having an elongated loop providing a lost motion connection, and a pull actuated trigger wire having a portion intermediate the ends thereof slidable through said coil spring, and having a line eye at its leading end and a lateral hitching eye at its trailing end, said last named eye being slidably hitched to said lost motion connection and also functioning as a keeper and being releasably connectible with said keeper hook.

2. The structure defined in claim 1, wherein the portion of said trigger wire intermediate the ends thereof is provided with a laterally bent crook, the latter constituting a stop shoulder and cooperating with said coil spring.

3. A pull actuated spring loaded fish hook construction comprising an expansible and contractible substantially V-shaped member embodying converging flexibly resilient limbs joined at corresponding ends through the medium of a coil spring, companion fish hooks carried by the opposite corresponding ends, the latter ends being spreadable and one of the latter ends having an inturned keeper hook, and a pull actuated trigger member having a line eye at one end, a keeper eye at the other end releasably connectible with said keeper hook, and having a crook intermediate its ends, said trigger member being slidable through said coil spring and said crook being associable with said spring, and a permanent hinging and sliding connection between the remaining latter end of the V-shaped member and the adjacent end of said trigger member.

PAUL J. SCHWARTZ.

REFERENCES CITED

The following references are of record in the file of this patent:

UNITED STATES PATENTS

| Number | Name | Date |
|--------|------|------|
| 44,368 | Gardiner | Sept. 20, 1864 |
| 51,651 | Davis et al. | Dec. 19, 1865 |
| 543,268 | Pettey | July 23, 1895 |
| 712,497 | Coffin | Nov. 4, 1902 |